Figure 2:
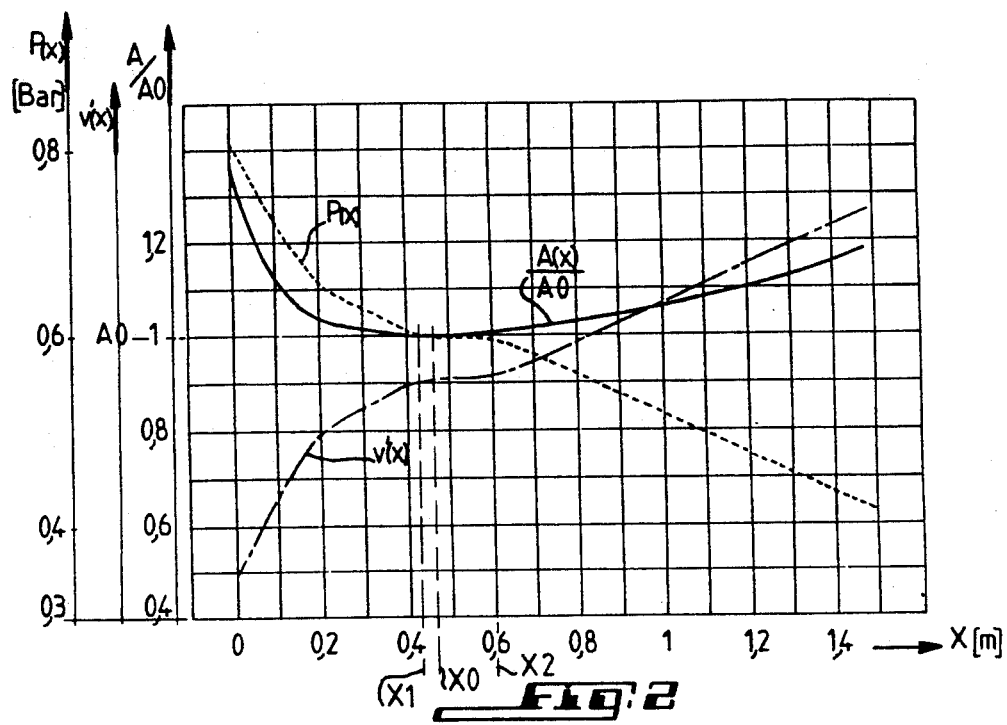

United States Patent [19]
Lardinois

[11] Patent Number: 5,261,242
[45] Date of Patent: Nov. 16, 1993

[54] PROCESS FOR EXTRACTION OF A SUBSTANCE FROM A GASEOUS CARRIER GAS, AS SOLID OR LIQUID PARTICLES AND SYSTEM TO OPERATE THE PROCESS

[76] Inventor: Jean-Paul Lardinois, Rue des Champs No. 15, 5030 Gemblaux, Belgium

[21] Appl. No.: 830,207
[22] Filed: Dec. 3, 1991

[30] Foreign Application Priority Data
Dec. 7, 1990 [BE] Belgium .................. 09001165

[51] Int. Cl.⁵ .................................................. F25J 3/00
[52] U.S. Cl. .......................................... 62/11; 62/38; 62/116; 62/500
[58] Field of Search ............... 62/8, 9, 11, 38, 116, 62/500

[56] References Cited

U.S. PATENT DOCUMENTS

| | | | |
|---|---|---|---|
| 2,548,568 | 12/1970 | Carlson, Jr. et al. | 62/9 |
| 2,893,214 | 7/1959 | Hendal | 62/11 |
| 3,559,373 | 2/1971 | Garrett | 62/11 |
| 3,775,988 | 12/1973 | Fekete | 62/9 |
| 4,424,680 | 1/1984 | Rothchild | 62/11 |
| 4,531,371 | 7/1985 | Voronin et al. | 62/11 |

*Primary Examiner*—Ronald C. Capossela
*Attorney, Agent, or Firm*—Steinberg & Raskin

[57] ABSTRACT

The invention concerns a process for extraction of a liquefiable substance from a gaseous carrier fluid. According to that process on one hand, we force the fluid to flow across a convergent-divergent nozzle such as that in that nozzle, the fluid is submitted to a fast expansion and, on the other hand, we define the cross sections (A(x)/Ao) along the axis (x) of the nozzle such as that the pressure diagram and the velocity diagram exhibit in the neighbourhood of the throat one landing section at least. Within those conditions, the liquefiable substance condenses and forms a cloud of drops of larger diameter and reduced concentration.

**

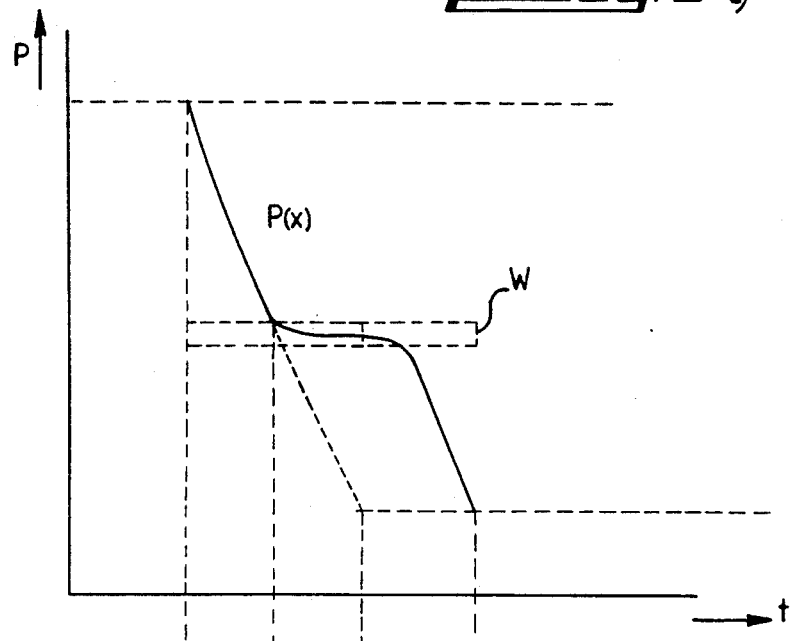
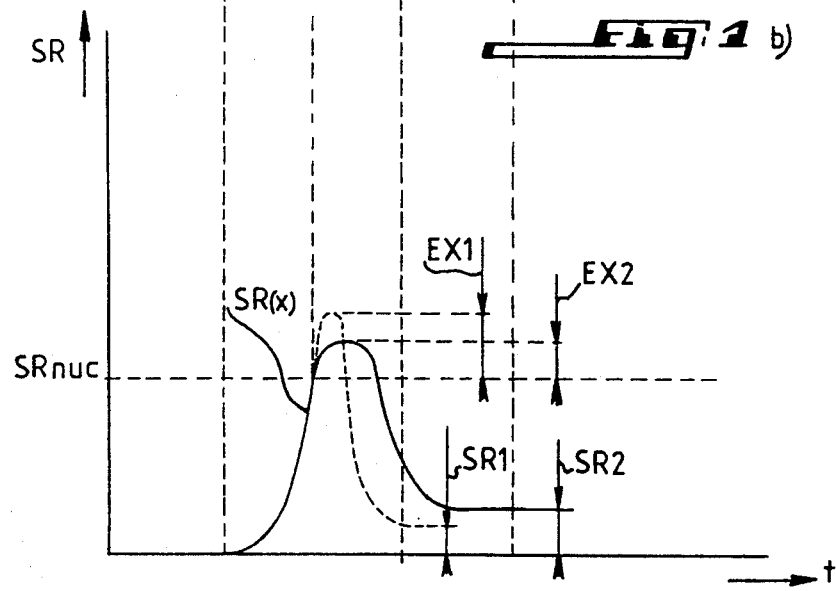

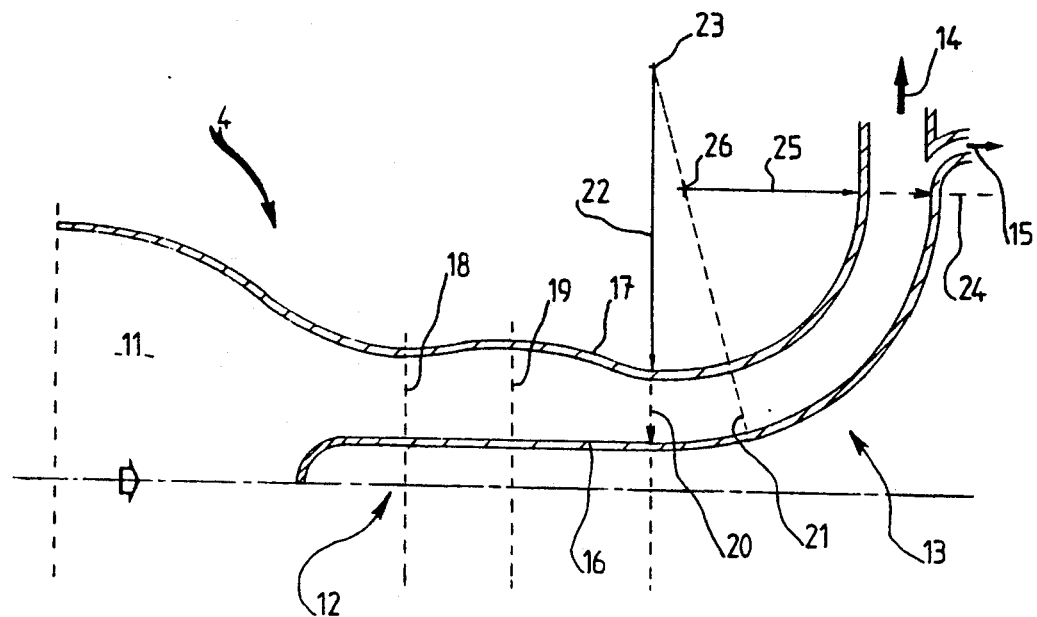
_Fig. 6_
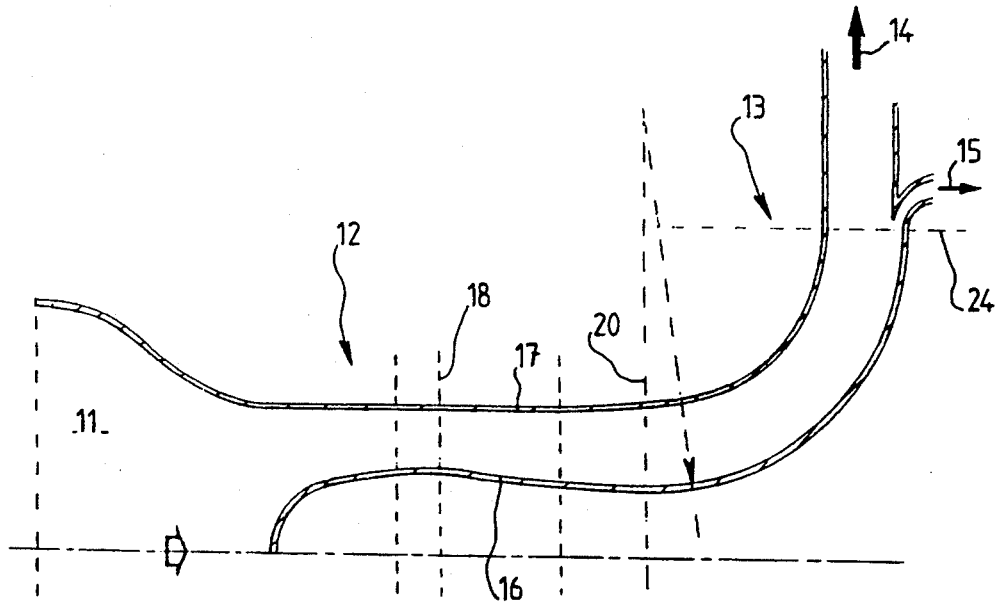
_Fig. 7_

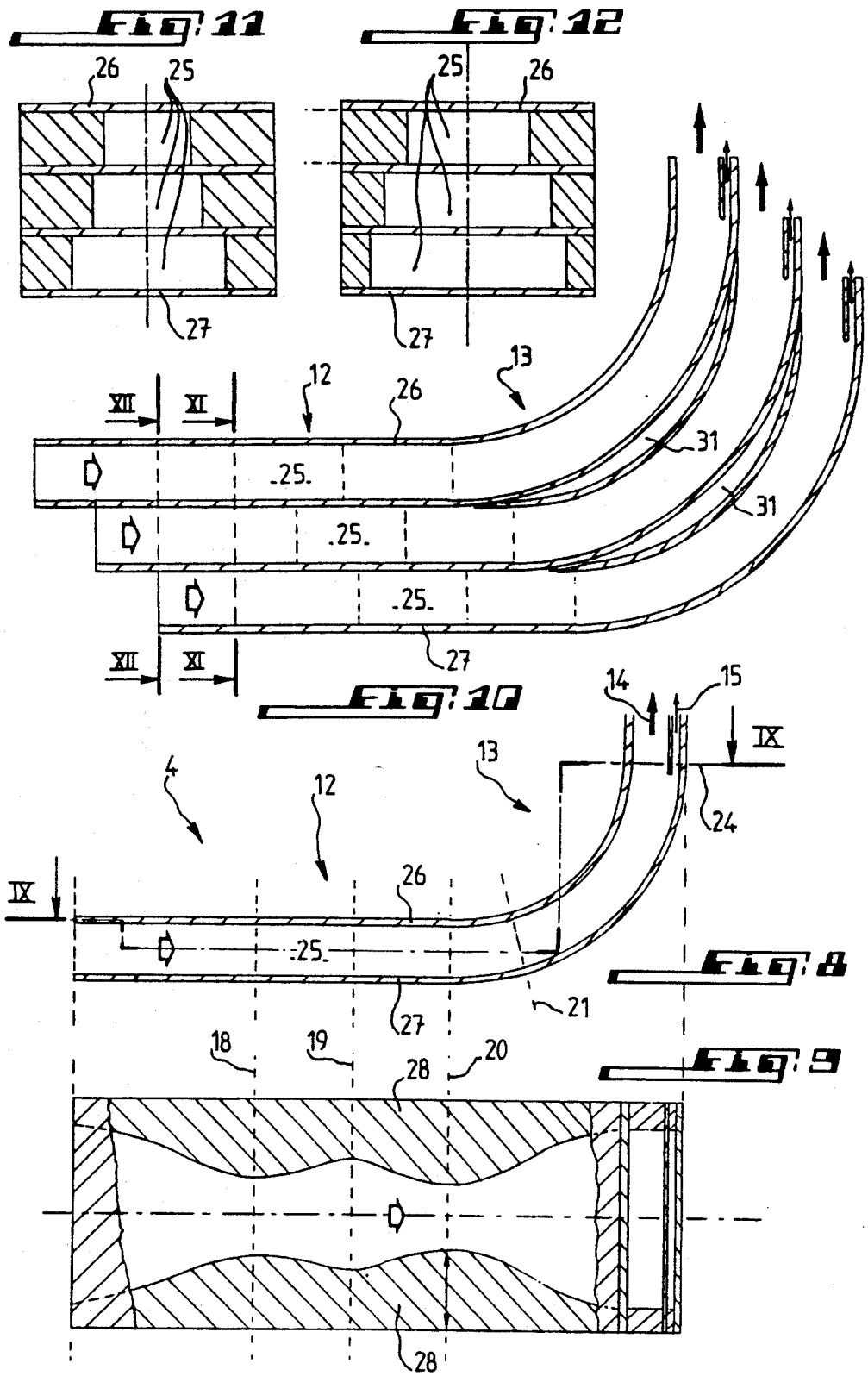

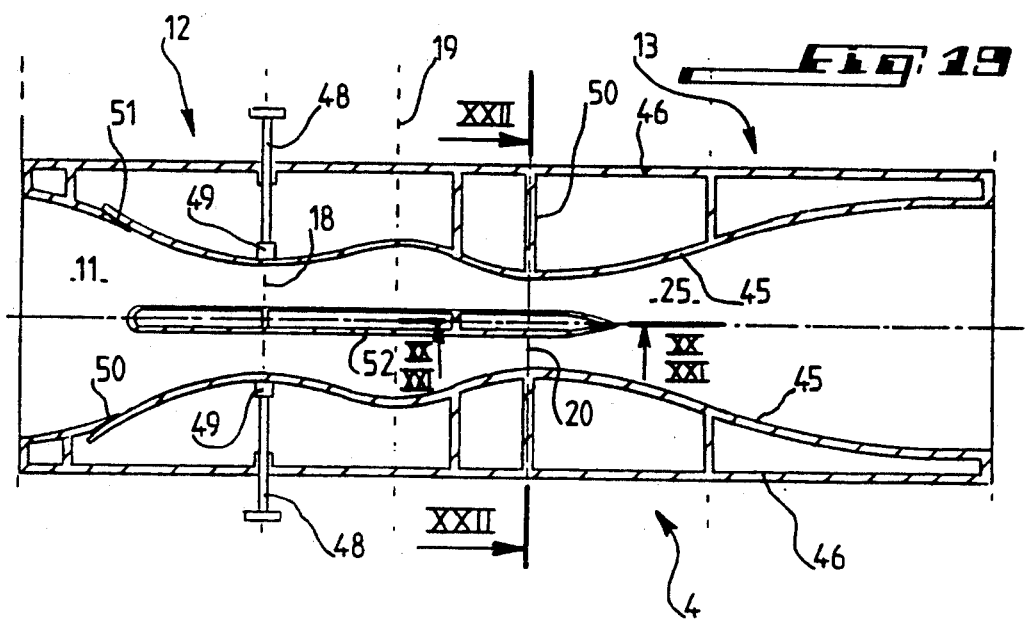
Fig. 19
Fig. 20
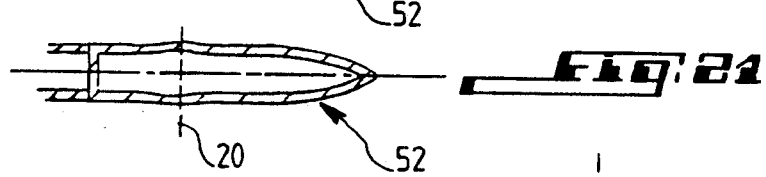
Fig. 21
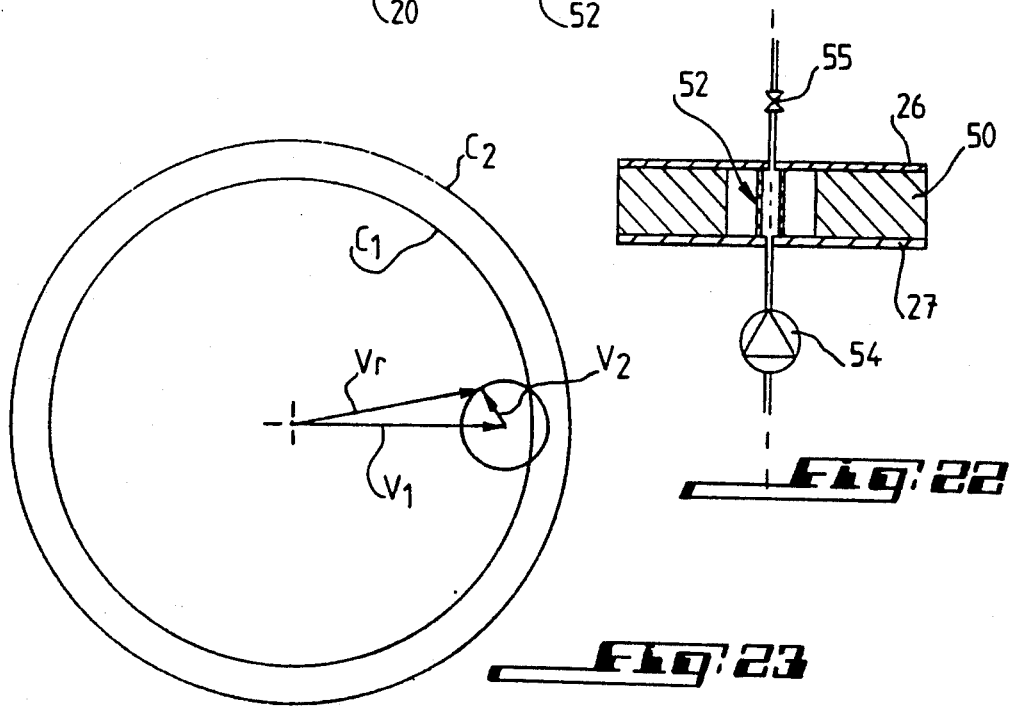
Fig. 22
Fig. 23

PROCESS FOR EXTRACTION OF A SUBSTANCE FROM A GASEOUS CARRIER GAS, AS SOLID OR LIQUID PARTICLES AND SYSTEM TO OPERATE THE PROCESS

The invention concerns a process for extraction of a substance from a gaseous carrier fluid, under the form of particles like solid particles or drops, according to which the carrier fluid is forced to flow to a high velocity, advantageously supersonic, or transonic, and introduce the flow in a separating device in which it is forced to follow a bended path, separation occurring under the effect of the centrifugal forces acting on the particles, and a system to operate the process.

A system of that kind wherein a bended and diverging canal, of rectangular cross section with a height larger than its width is known for separation of particles as result of inertia. The growth of the cross section is obtained as result of the growth of the height of the canal in the direction of the flow in the plane of curvature.

This known system has the disadvantage that the growth of the canal's height increases the distance that the particles have to cross. As consequence, the separation effect of this system is reduced.

The object of the present invention is to get the rid of the disadvantage described before.

To achieve that goal, the process according to the invention is characterized by the fact that the cross section of the separation canal is enlarged to obtain an increase of the velocity of the fluid in the canal, without to increase the distance that the particles have to cross.

According to an advantageous topic of the invention when the substance to extract from the carrier fluid is a liquefiable substance whose concentration is close to the saturation state of that substance, the fluid is subcooled by adiabatic expansion in a nozzle, according to conditions providing condensation under the form of particles of liquefied substance relatively large and feed the separation canal described before.

According to an other advantageous topic of the invention, when the purpose is to extract a substance contained in the carrier gas under the form of small particles, the carrier flow is accelerated by adiabatic expansion in a nozzle, create an auxiliary flow carrying liquefied particles as described before, combine the flows as to force the particles created in the auxiliary flow to cross the fluid veins carrying the particles to extract to provoke the absorption of the small particles by the larger ones of liquefied substance as result of a stimulated coagulation phenomenon.

The system to operate the invention according to the invention is characterized by the fact that the separation canal has a constant height whereas its width increases in the way of the flowing fluid.

According to an advantageous characteristic of this system, the adiabatic expansion nozzle referred before has a narrowed section forming a throat whose profile is adapted to obtain a subcooling sufficient to initiate nucleation but small enough to avoid the formation of a too large number of liquefied substance, and a diverging section, following the throat and which is configured to favour the growth of the particles formed before with a very low or zero rate of formation of new particles.

According to an advantageous characteristic of the invention, the sections referred before wherein the particles previously formed are growing is designed as to keep the velocity of the flowing fluid approximatively constant, or varying slightly, and to let the subcooling resorb below the critical value of nucleation.

The invention will be better understood, and others goals, topics, details and advantages of it will become more evident after the coming explanatory description which refers to the schematic drawings appended and which are given solely as examples to illustrate several ways to operate the invention, and where:

FIGS. 1*a* and 1*b* are showing the schematic evolution of the pressure and subcooling along the x axis of a nozzle according to the state of the art and according to the invention;

FIGS. 2 and 3 are sketching the profile of a nozzle according to the invention and the physical parameters characterizing it along the axis of the nozzle. The physical parameters sketched are those of steam flow at 1 bar and 373,15° K. The diagrams are derived from computer simulation performed at the Royal Military Academy, Brussels;

FIG. 4 illustrates a method to find the profile of a nozzle according to the present invention;

FIG. 5 is a schematic view of a system wherein a module of nozzle and separator is integrated;

FIG. 6 is a view, in axial cut, of a first way to design a module according to the invention;

FIG. 7 is a view, in axial cut, of a modified version of the module sketched on FIG. 6;

FIG. 8 is a view, in axial cut, of a second way to design a module of nozzle and separator according to the present invention;

FIG. 9 is a view, in partial cut, along the line IX—IX of FIG. 8;

FIG. 10 is a view, in axial cut of a third way to design a module of nozzle and separator according to the present invention;

FIG. 11 is a cut view along the line XI—XI of FIG. 10;

FIG. 12 is a cut view along the line XII—XII of FIG. 10;

FIG. 13 sketches a fourth way to design a module of nozzle and separator according to the present invention;

FIG. 14 sketches a fifth way to design a module of nozzle and separator according to the present invention;

FIG. 15 to 18 are cut views respectively along the lines XV to XVIII of FIG. 14;

FIG. 19 sketches a sixth way to design a module of nozzle and separator according to the present invention;

FIGS. 20 and 21 are cut views, with wrenching, along the lines XX and XXI of the wall 52 of FIG. 19 and are showing it in two different operating conditions;

FIG. 23 sketches schematically the way according to which the module described on FIG. 19 works.

The invention concerns a process and apparatus for separation of solid particles or liquefied substance from their carrier fluid. It implies the use of an inertial separator and, upstream of it, when needed, a nozzle system whose general function is to transform the fluid carrying the substance to extract into a rapid flow allowing to separate the substance as result of the inertial effect. This flow may be created by adiabatic expansion in a nozzle. When the substance to extract is a liquefiable substance whose concentration in the carrier flow is close to saturation, this adiabatic expansion of the fluid at the outlet of the nozzle has for effect that the substance liquefies on the form of drops. A principal aspect of the present invention consists to conduct the adiabatic expansion with respect to conditions allowing the formation of a reduced number of particles of liquefied substance, when compared to state of the art, but having a large size. It has been established that those particular conditions may be matched with a convergent-divergent nozzle having a particular profile.

This fundamental aspect of the invention is described hereafter. It is known that the adiabatic expansion across a nozzle of the kind referred above, when the gas flow constitutes a mix including a component whose partial pressure is close to saturation, has the following consequences:

Its partial pressure exceeds the saturation pressure associated with it's local temperature, and in case of transition towards thermodynamic equilibrium, a very large number of particles of liquefied substance is formed.

The heat of vaporisation of those particles is released in the gas mix and causes an increase of the temperature of the expanded flow and a concomitant reduction of the aerodynamic cooling.

The pressure, the temperature and the specific volume along the nozzle profile are then deviating from the values they would have had if no condensation would have occurred.

The heat released in the flow, as result of the formation of the particles accelerates or slows the flow depending it is subsonic or supersonic.

However, if the expansion occurs very rapidly, a thermodynamic equilibrium has not enough time to settle. Indeed, heat and mass transfers are diffusional processes which are needing more time to match a situation of equilibrium than expansion which is almost balanced with the velocity of sound.

Further, it is also known that very small particles (having a diameter of several nanometer) have a natural trend to evaporate spontaneously if not surrounded by a supersaturated atmosphere. This is due to the fact that surface forces acting at the skin of the particles are inversely proportional to the particle's radius. Because of those forces, the pressure inside very small particles may be significatively higher than the pressure of the surrounding gas. In this case, the particle evaporates spontaneously.

On the other hand, when a particle is surrounded by a highly supersaturated atmosphere, it grows. For every supersaturation ratio, there is a critical radius below which a particle evaporates spontaneously and above which its volume increases. When the supersaturation ratio is low, the critical radii are large and the probability of formation of particles or drops within a reasonable delay is very low. Theoretical calculation and experimental test both have teach that, when the supersaturation ratio is progressively increased, the rate of formation of particles , the nucleation rate keeps at first extremely low and increases suddenly when important supersaturation ratios are reached. On the other hand, it has been observed that nucleation occurs along a line corresponding to a moisture ratio approximatively constant on a enthalpy-entropy diagram, This line is called the Wilson line.

FIGS. 1*a* and 1*b* are sketching with interrupted lines the respective evolution of pressure P and supersaturation SR occurring in a gas flow adiabatically expanded in a known nozzle. The values of pressure and subcooling are sketched in function of time t. One may observe that the slope of the tangent to the curve P is high and that the velocity at which the subcooling SR is created is also high. The gas flow enters rapidly in the Wilson Zone W, the slope of the tangent to P is high and the subcooling becomes important. In particular, the excess EX1 of the maximal subcooling compared with the critical subcooling SRnuc is relatively important. This fact causes a high nucleation rate and resulting excessively large number of particles or drops. The residual subcooling SR1 at the end of the expansion is moderate, because every new non-equilibrium created by the ongoing expansion is resorbed more rapidly because of the very high concentration of drops. Now, this classic scheme of condensation which conducts to the formation of a large number of thin drops has the disadvantage that those particles, because of their very small size are difficult to extract from their carrier gas with an inertial separator.

The invention is based on the discovery, as explained before, that it is possible to avoid the formation of a large number of small particles and to perform a condensation of the liquefied substance under the form of a reduced number of drops of larger diameter by a the lead of pressure P and subcooling SR according to the curves drawn in continuous lines sketched on FIG. 1*a* and 1*b*. It is observed that in the case of the invention the slope of the tangent to the pressure curve is smaller in the neighbourhood of Wilson zone W than in state of the art. The rhythm at which the subcooling is created is then slowed. The flow enters "smoothly" in the Wilson zone. A phenomenon of self quenching of nucleation occurs, as consequence of the heat release provoked by condensation, which produces its effects when the concentration of drops is still small. This is shown on FIG. 1*b* where the value of EX2 is smaller than EX1. This phenomenon of self quenching impeaches the formation of new drops. On the contrary, the drops which are already existing undergo an increase of their volume. This is due to the fact that expansion is going on at a reduced rhythm or interrupted, the subcooling which is temporarily not fed by the pursuit of expansion, may resorb and reach values which are essentially smaller than SRnuc before expansion is restarted.

It has been observed in the context of the present invention that a condensation such as the one described by the curves according to the invention is feasible in a converging-diverging nozzle having a particular profile. The profile of such a nozzle is sketched on FIG. 2 by the continuous line. This figure gives the ratio of the cross section A at a current point x along the axis of the nozzle to the cross section of the throat AO. The curves v′(x) and P(x) respectively sketch for this nozzle profile the evolution of the ration of the flow velocity to the local velocity of sound (Mach number) and the pressure in the fluid flowing across the nozzle. One observe that both velocity v and pressure P exhibit a landing section in the neighbourhood of the throat AO of the nozzle located between x1 and x2. FIG. 3 illustrates the evolution of the subcooling SR, of the temperature T of the flow, of the radii of the particles RP and of the nucleation rate along the axis x of the nozzle. One observe that the subcooling i increases until the entrance in the neighbourhood of the throat AO of the nozzle. In this neighbourhood, at first remains constant and then diminishes. About nucleation, one observe that the curve presents the shape of an impulsion of relatively large width and small height. Indeed, the nucleation occurs at the level of the throat slightly upward, within a zone whose length is important, of about 25 cm for example.

In comparison, in a known converging-diverging nozzle, this impulsion would have a very small width from 0,5 to 1 mm and would have a much more important height. This very sharp and narrow nucleation pulse of state of the art nozzles has for consequence the formation of a very large number of very small particles. In the context of the invention, the fact that the nucleation pulse is much larger and has a substantially smaller height means that it is a process occurring much slower and giving birth to a much reduced number of particles. The condensation of the liquefiable substance has occurred notably by growth of a comparably low number of particles, essentially upward to the section of the throat section of the nozzle as it may be observed on the RP curve which illustrates the growth of the average radius of the particles. The irregularities in the RP(x) curve are due to a not yet optimum nozzle profile.

Figure 3:
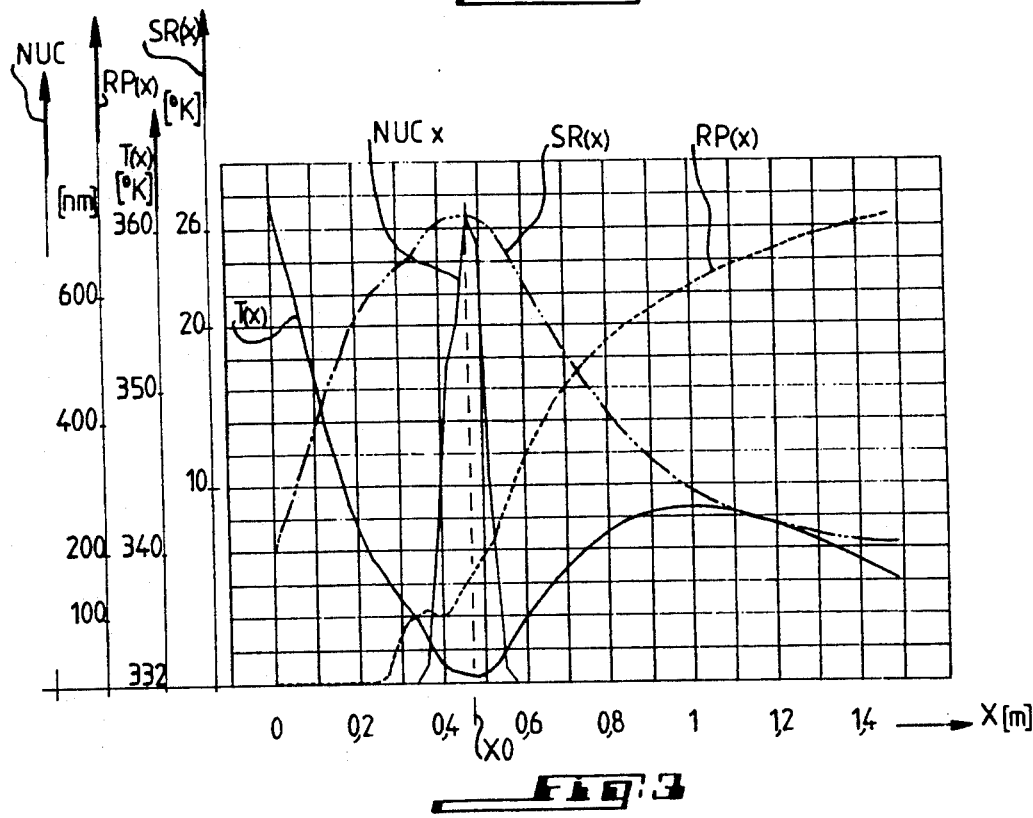

FIGS. 2 and 3 clearly show that the profile of the nozzle according to the invention is suitable to form particles having an average diameter of 1,2 micrometer in the narrowed sections for a final Mach number of 1,26 and is characterized by the particular thermodynamic properties described before.

FIG. 2 also shows that the Mach number in the throat section is below unity without to impeach the flow to become supersonic downstream under the effect of the heat release provoked by condensation and after, because of the growth of the cross section.

This property characterizing the invention is very useful because it permits to compress the flow in a converging-diverging nozzle downstream of the separator without to need to start the supersonic flow.

This fact permits to reduce head losses of the system and save the cost of auxiliary apparatuses which are needed by state of the art to start the supersonic flow.

Because of the complexity of the mathematical equations systems describing the phenomenons occurring in condensing nozzles, notably because of their non linearity, there is no analytic solution describing the flow in a condensing nozzle and demonstrating the existence of relations between the parameters characterizing the this flow and the nozzle profile along it's axis.

However, it has been possible to obtain a satisfactory description of a condensing flow in a nozzle with computer simulation programs proceeding by successive iterations, but which converge slowly because of the fact that nucleation starts suddenly. Each time a nozzle profile is defined, we check if the several parameters are evoluating according to the curves illustrated on FIG. 2 and 3.

If it is not the case, we need to modify the shape of the nozzle and restart the calculations. To reduce the perimeter of investigations by withdrawing the solutions which are bad for sure, we purpose, according to the invention, to define limit nozzle profiles TY1 and TY2 which frame the profile which is looked for TY. We determine hereafter those profiles TY1 and TY2 in such a way that they frame the profile TY tightly enough to make the design rapidly. FIG. 4 illustrates those several nozzle profiles.

As it has been explained before referring to FIG. 1, condensation by formation of a relatively low number of drops, but of large volume is obtained according to the invention by creation of conditions which ensure that the pressure P(x) enters smoothly in the Wilson Zone as it is showed on FIG. 1*a* (continuous line) and, as consequence, the excess EX2 of the real maximal subcooling upon the critical subcooling SRnuc at which nucleation is starts is as small as possible. There is a link between the slope of the tangent to the pressure curve, just upstream of the section Anuc, i.e. the section where nucleation starts, and the excess EX mentioned before. If the slope dP(x)/dx just upstream of that section Anuc increases, EX increases, and if dP(x)/dx at this place is reduced, EX is also reduced. Considering this link, it is possible to design from the nozzle profile limits TY1 and TY2 the profile of the nozzle TY according to the invention.

The profile of the canal TY1 needs to follow in the neighboured of the section Anuc a range wherein the value of dP(x)/dx is simultaneously quasi constant and as small as possible. It has be established that this purpose may be obtained by imposition of a constant instantaneous expansion rate PI upstream of Anuc, i.e. in every section where the moisture content of the flow is zero. The profile TY1 is therefore the one of a non condensing flow, i.e. a dry flow. this profile may be defined according to the following equation.

It is known that the instantaneous expansion rate is defined by:

$$PI = -(1/P)\cdot(dp/dt) \qquad (1)$$

by integration of this expression we obtain:

$$P/P_0 = \mathrm{EXP}(-PI_c\cdot t) \qquad (2)$$

where $P_0$ is the initial pressure and $PI_c$ is the imposed value of expansion rate PI. EXP expresses that it is an exponential function.

The ratio P/PO may also be expressed in function of the ratio of the specific heats and the Mach number as follows:

$$P/P_0 = 1/(1+(k-1)/2\cdot M^2)^{(k/(k-1))} \qquad (3)$$

where k is the ratio of the specific heats and M the Mach number.

Equalizing expressions (2) and (3) we obtain $$1+\tfrac{1}{2}\cdot(k-1)\cdot M^2 = \mathrm{EXP}(+\{(k-1)/k\}\cdot PI_c\cdot t) \qquad (4)$$

Assuming $Z=1+((k-1)/2)\cdot M^2$(5), we can express the Mach number as follows:

$$M(Z) = \{2/(k-1)\cdot(Z-1)\}^{\frac{1}{2}} \qquad (6)$$

To determine the cross section A(x) along the x axis of the nozzle, we can use the following set of equations:

$$A = Q_0/(\mathrm{Rho}\cdot w) \qquad (7)$$

Where $Q_O$ is the mass flow, Rho the volumic mass and v the local velocity of the flow.

The volumic mass may be expressed as:

$$\mathrm{Rho}/\mathrm{Rho}_0 = 1/(Z^{1/(k-1)}) \qquad (8)$$

The velocity v may be expressed by the following equations:

$$w = M\cdot c \qquad (9)$$

$$c = (k\cdot R\cdot T)^{\frac{1}{2}} \qquad (10)$$

$$T/T_0 = 1/Z \qquad (1)$$

$$w = \{(2\cdot k\cdot R\cdot T_0/(k-1))\cdot((Z-1)/Z)\}^{\frac{1}{2}} \qquad (12)$$

where c is the local velocity of sound, T the temperature, TO the initial temperature and R the constant of gases.

Substituting in equation (7) Rho and v deducted from equation (8) and (12), we obtain:

$$A = \{(Q_0/Rho_0)/(2 \cdot k \cdot R \cdot T_0/(k-1))^{\frac{1}{2}}\} \cdot Z^{(k+1)/(2 \cdot (k-1))}/(Z-1)^{\frac{1}{2}} \quad (13)$$

or $$A = C_1 \cdot Z^{(k+1)/(2 \cdot (k-1))}/(Z-1)^{\frac{1}{2}} \quad (14)$$

assuming $$C_1 = [(Q_0/Rho_0)/\{2 \cdot k \cdot R \cdot T_0/(k-1)\}^{\frac{1}{2}}] \quad (15)$$

To express the abscissa in function of the parameter Z, we need to integrate the expression $$x = \Sigma v \cdot dt \quad (16)$$

and express the result in function of Z $$x = \Sigma \{(2 \cdot k \cdot R \cdot T_0/(k-1) \cdot ((Z-1)/Z)\}^{\frac{1}{2}} \cdot dt \quad (17)$$

Choosing Z as variable, and deducing the value of dt from relation (4) which also expresses the value of Z, we obtain:

$$X = \Sigma \{(2 \cdot k \cdot R \cdot T_0)/(k-1)/((Z-1)/Z)\}^{\frac{1}{2}} \cdot (k/\{(K-1) \cdot P \cdot I_c\}) \cdot dZ/Z \quad (18)$$

Assuming now that $$u^2 = (Z-1)/Z \quad (19)$$

We obtain:

$$x = \Sigma C_2 \cdot \{(Z-1)/Z\}^{\frac{1}{2}} \cdot dZ/Z \quad (20)$$

$$x = \Sigma C_2 \cdot 2 \cdot u^2 /(1-u^2) \cdot du \quad (22)$$

Assuming $C_2 = \{2 \cdot k \cdot R \cdot T_0/(k-1)\}^{\frac{1}{2}} \cdot (k/\{(k-1) \cdot PI_c\}) \quad (21)$ After calculations, we obtain:

$$x = 2 \cdot C_2 \cdot \{-u - \frac{1}{2} \cdot Ln((1+u)/(1-u))\} \quad (23)$$

(23) gives the link between x and u(Z). Defining a succession of points along the x axis, regularly spaced, we can find the value of Z at each of those points. The cross section A(x) along the x axis of the nozzle is obtained from equation (14). We have so defined the profile of TY1 of FIG. 4.

To obtain the profile of the nozzle canal TY2, we refer to TY1 and assume that the moisture content is maximal in every section of the canal. More precisely, we assume that in every section A(x) of the nozzle, the pressure P and the Mach number M are identical to the corresponding values for TY1. We will calculate in every section A the amount of condensed moisture, assuming that the partial pressure of the liquefiable substance is equal to the saturation pressure at the local temperature. We will also consider the energetic balance. By this method, we will obtain for every section a value for the temperature and velocity.

The profile TY2 will be obtained using the expression of the conservation of the flow:

$$A(x) = Q(x)/[Rho(x) \cdot v(x)] \quad (24)$$

where Q is the mass flow of the gaseous phase, Rho is the volumic mass in kg/m$^3$ and v the local velocity of the flow.

We will remember that if the mass flow (gas+liquid) is constant, the gas flow is variable because condensation modifies the mass partition between the phases.

Figure 4:
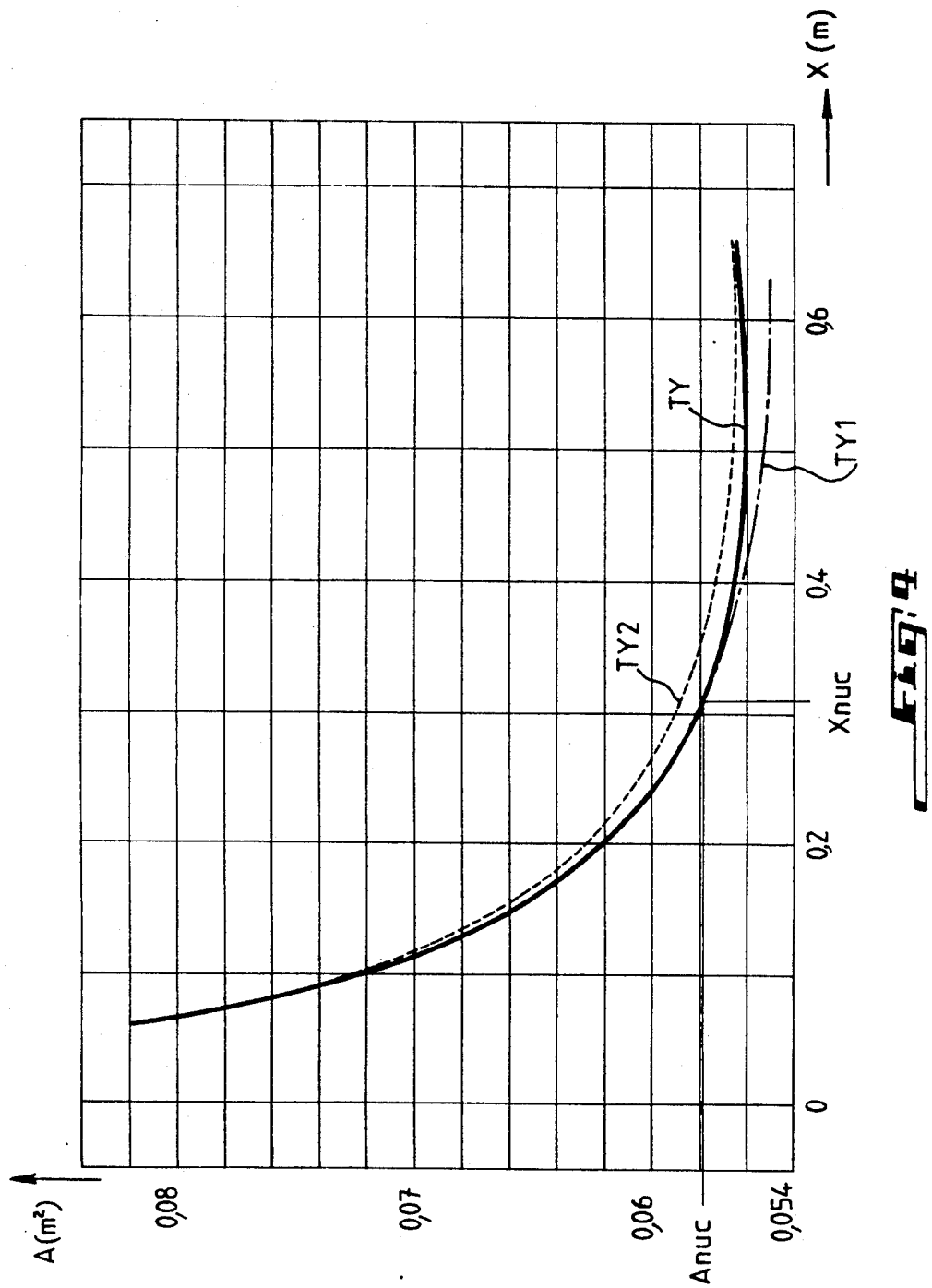

Expression (24) permits to define the profile of the nozzle TY2 of FIG. 4.

We observe that the section A(x) of nozzle TY2 is greater than or equal to the section A(x) of nozzle TY1 for every section A along the Axis x.

This is due to the fact that in nozzle TY2 the gas is systematically hotter and that for a same pressure it's density is reduced. It is therefore the value of Rho in the expression given above which is responsible of this ratio of cross sections. We also observe that in nozzle TY2 the throat section Ao has moved in the upstream direction when compared with TY1. The profile TY2 may be considered as the one giving in every section a same pressure and Mach number than the profile TY1 but wherein the moisture content is instantaneously at it's equilibrium state. It would be the case if the flow would be seeded with an infinity of condensation nuclei.

The profile of nozzle TY according to the invention is framed between TY2 and TY1, those profile corresponding respectively to hypothesis of maximal moisture content and zero moisture content.

Before the section $A_{nuc}$, the profile TY may be anyone as long as the section A is larger than $A_{nuc}$. When A approaches the value of $A_{nuc}$, the profile TY must be identical to TY1 so that, for $x = x_{nuc}$, we effectively have the low values of dP/dx requested. From section $A_{nuc}$, we must progressively enlarge the section to allow the release of the heat produced by condensation. We will therefore leave the profile TY1 tangentially to approach tangentially the profile TY2, as shown on FIG. 4.

We will then proceed by trial and error to obtain shape of curves exhibited on FIGS. 2 and 3 accounting with the necessity to open the section as soon as possible downstream of section $A_{nuc}$.

We observe that the throat of the nozzle according to the invention is located upstream of both throats of the profiles TY1 and TY2. It is advantageous that the profile of the nozzle according to the invention merges with the profile TY2 at the end of the nucleation zone.

After having described the cross sections of a nozzle according to the invention, we expose below several considerations concerning the length of the nucleation zone of this nozzle, which is an important geometric characteristic. Indeed, there is a minimal length below which it is not possible to produce drops having a sufficient diameter independently of the surface of the throat section Ao.

To estimate this minimal length, it is necessary to select, an appropriate value of the instantaneous expansion rate $PI_c$. The choice of $PI_c$ is ruled by the necessity to enter smoothly in the Wilson zone. The evolution of the gas in the nozzle is of the adiabatic kind, which is described by the following relation:

$$P/P_0 = (T/T_0)^{k/(k-1)} \quad (26)$$

We can bind $PI_c$ and $dT/dx$ by derivation regarding to t the natural logarithm of the expression (26). We obtain so:

$$PI_c = [k/(k-1)] \cdot (-1/T) \cdot (dT/dx) \cdot v \qquad (27)$$

If $T = T_{nuc}$ and $v = v_{nuc}$, the only unknown term of the right member is $dT/dx$. It suffices then to assign to it an arbitrary and reasonable value, for example 85° C./m to know the value of $PI_c$. Assuming that $v_{nuc} = 300$ m/s; $T_{nuc} = 300°$ K.; $k = 1.4$, we obtain $PI_c = 300/s$.

The profiles TY1 and TY2 have, by hypothesis, the same length. It is easier to make considerations on the length of the profile TY1 because we have analytic expressions, as it has be exposed before.

The abscissa $x_{nuc}$ defined, as exposed before, the position of the cross section wherein the subcooling SR is equal to $SR_{nuc}$. This last value represents a thermodynamic state at which corresponds a value of $Z_{nuc}$ of the parameter Z defined before and values of $P_{nuc}$, $T_{nuc}$, $M_{nuc}$ which are associated. We can define an abscissa $x'_{nuc}$ such as that:

$$SR(x) = SR_{nuc} + \delta T$$

$SR_{nuc} + \delta T$ represents also a thermodynamic state at which corresponds a value $Z'_{nuc}$ of the parameter Z and the values $P'_{nuc}$, $T'_{nuc}$, $M'_{nuc}$. This value of $Z'_{nuc}$, as the one of Z is independent from $PI_c$.

The distance $D = x - x'$ is inversely proportional to the value of $PI_c$ as is emerges from the equations given before. We then can choose an arbitrary reasonable value of $\delta T$, 15° C. for example, to estimate the minimal length. The choice of $\delta T$ is not fully arbitrary. In fact, we know that the nucleation rate increases very fast as soon as the subcooling reaches the value $SR_{nuc}$. It is therefore desirable that $\delta T$ represents only a fraction of $SR_{nuc}$. For example, $\delta T$ will be equal to 0,3 to 0,6 $SR_{nuc}$.

We have however to note that there is a link between the instantaneous expansion rate PI and the length of the converging section of the nozzle.

In nozzle TY1, the value of the parameter Z at the throat is always equal to 1,2. This fact permits to make a diagram sketching the length of a convergent of the kind PI = Constant for given thermodynamic conditions at the inlet. We can then observe that, for very short nozzles, the value of PI is so high that the Wilson Zone may not be entered smoothly. A nozzle having a convergent length of 10 cm would have an average value of PI = 1808/s, what, with the conditions evoked before corresponds to values of dT/dx of 516° C./m, or 5,16° /cm. This value rules out the possibility to enter smoothly in the Wilson Zone.

Values of dT/dx about 0,5° C./cm to 1° C./cm are more appropriate. They correspond to values of PI which can be determined using formula (27).

It comes out of what has be exposed before that it is necessary to hold the scale of lengths when we desire to design an apparatus having an other nominal flow. Indeed, if we reduce of a factor two the nominal flow, it suffices to reduce the cross sections of a factor two without to change the scale of length. In the opposite case, we would have a contraction of the nucleation "cylinder" and a reduction of the average diameter of the drops formed.

we will describe hereafter, referring to the FIG. 5 to 23 a system to extract a substance present in a gaseous carrier flow under the form of particles, which uses a or a set of several nozzles designed according to the considerations which have been exposed before.

Figure 5:
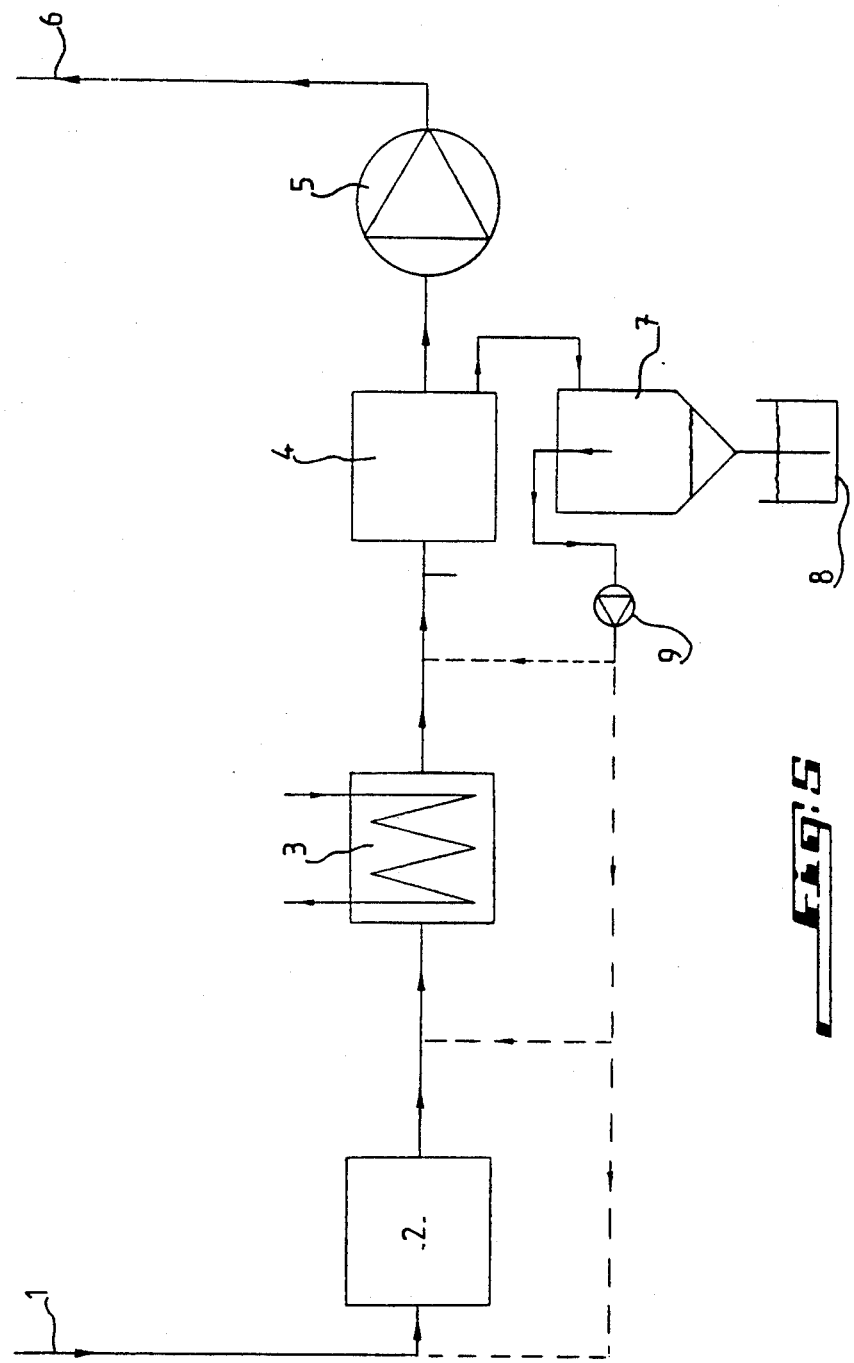
Figure 13:
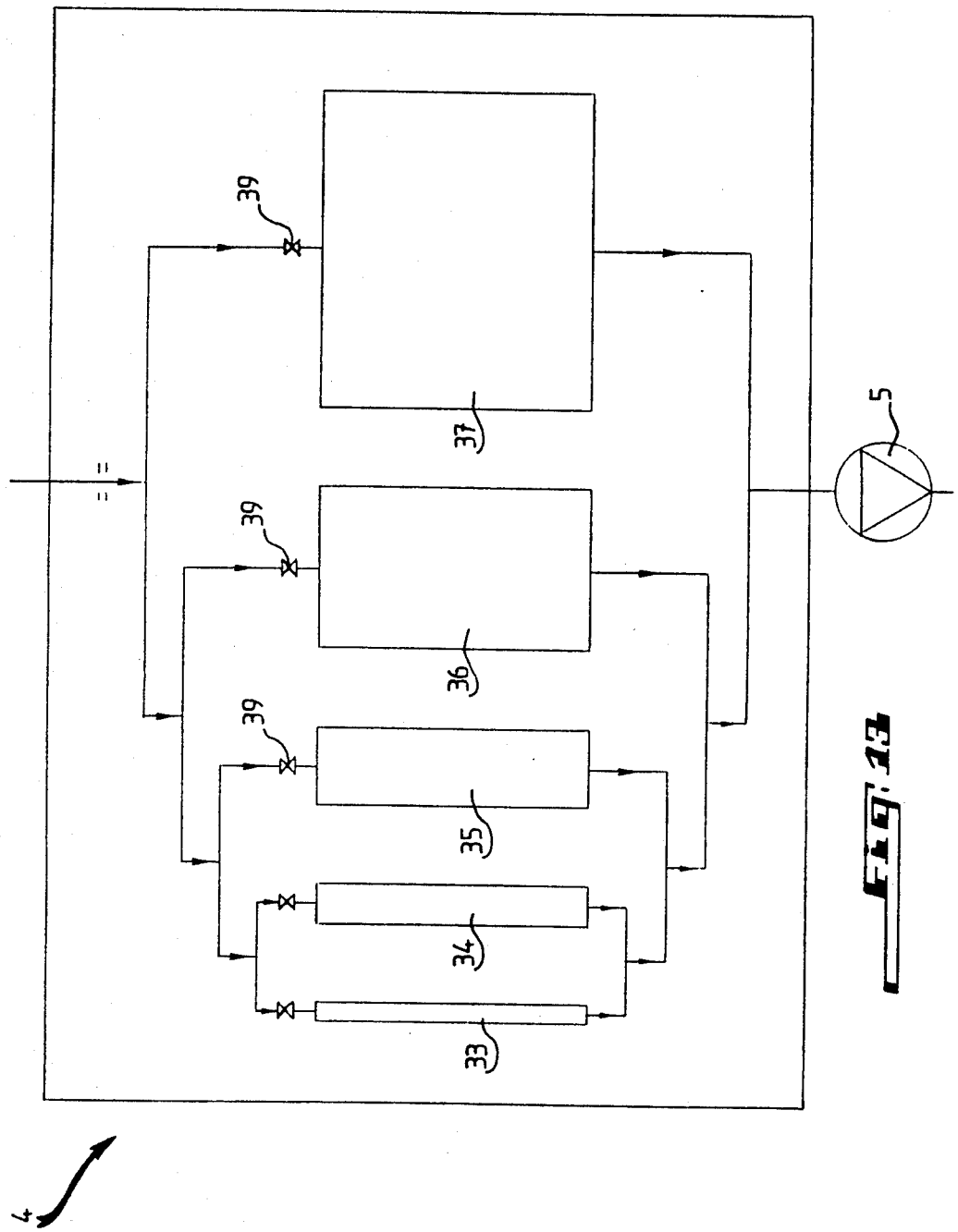
Figure 14:
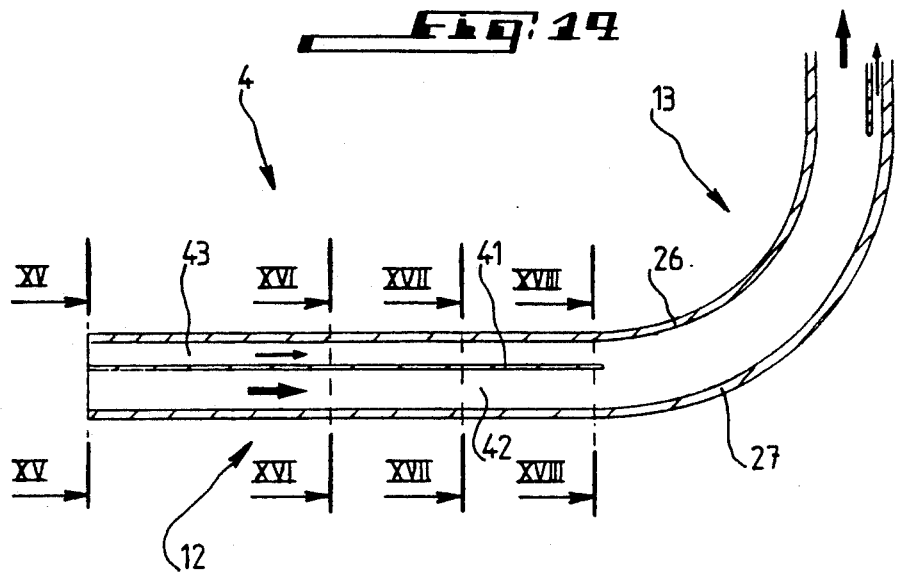
Figure 15:
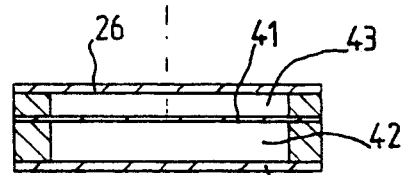
Figure 16:
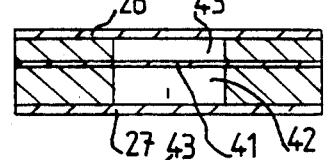
Figure 17:
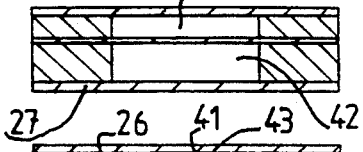
Figure 18:

FIG. 5 shows, as an example, a system according to the invention involving successively in the path of the flow of the fluid received in (1) a first embodiment (2) formed by a collector of particles, like a filter or a cyclone whose function is to extract from the fluid the particles having a diameter which is too large, or medium large and which are susceptible to obstruct the following embodiments or to erode them intensively, a second embodiment 3 formed for example by a heat exchanger and devoted to adjust the temperature of the fluid to a value optimizing the moisture ration before the fluid enters the next module, i.e. module 4 which contains a nozzle or a set of nozzles according to the invention. Downstream of this module, an embodiment like a fan (5) whose function is to make sure the flow goes trough the system by a suction effect. Reference 6 shows the outlet of the system.

The module 4 divides the carrier flow in two flows, a principal flow, from which particles and liquefiable substances are extracted and which is introduced in the fan block 5, and a secondary flow carrying the particles and/or the liquefied substances extracted from the carrier flow.

This secondary flow is conducted to an auxiliary separator 7.

A tank 8 is associated to it to receive the possible liquid substances from the secondary flow, whereas the gaseous phase of it leaves the embodiment 7 by the help of a suction fan 9 and is then recycled upstream of the nozzle embodiment 4. As shown with doted lines, the recycling may be done directly upstream of embodiments 2, 3 or 4 or elsewhere.

Reporting to FIGS. 6 to 23, we describe hereafter several modes for the design of a module 4 according to the present invention.

The option showed on FIG. 6 has the form of an axisymmetric body including a cylindric inlet 11 aimed to receive the gas carrying a liquefiable substance, an annulus section 12 constituting a nozzle according to the invention, aimed to condense the liquefiable substance under the form of small drops, and a separation section aimed to separate the drops from their carrier gas. This one leaves the module after extraction of the liquefiable substance in 14 whereas the liquefied substance comes out in 15 under the form of the secondary flow mentioned before. The nozzle section 12 has the profile which has just be described, defined between the walls basically cylindric respectively radially internal 16 and external 17. It includes a first converging inlet ending by a a throat 18 where the subcooling reaches values high enough to start nucleation, but low enough to avoid the formation of a number of drops excessively large.

The cross section of the annular canal is moderately enlarged downstream of the throat section 18 until cross section 19. This conception of the flow canal insures a growth of the drops as said before with more details. The subcooling is reduced below critical values because of the growth of the drops. From cross section 19, the flow canal is contracted once new until section 20. In the portion of canal located between cross sections 19 and 20, the expansion of the carrier flow goes on. The nucleation rate is practically zero in this portion. Because of the heat release and of the reduction of the number of moles in the gaseous phase which occurs simultaneously, the Mach number of the flow is below unity in the narrowing section 20. The nozzle conception which has already be described permits to lengthening of the nucleation zone and of the time lapse of the nucleation pulse and makes sure that the subcooling is reduced favouring a growth of the first drops instead of to favour the formation of new ones.

From section 20, which constitutes the inlet in portion of separator 13, the diameter of the radially internal wall 16 of the canal increases as to have a curved profile. In the entrance portion, this curvature appears between the entrance section 20 and an intermediate cross section 21 according to a curvature radius shown in 22 and whose centre is indicated with reference 23. This portion of annulus canal is followed by a portion which goes until cross section 24 and has a smaller curvature radius 25. The centre of curvature is indicated in 26. The distance between the walls radially internal 16 and radially external 17, i.e. the height of the annular space of the canal, is constant on the whole length of the separator 13. In this part 13, the expansion of the fluid carrying drops formed in the part of nozzle 12 may go on at higher velocities because of the growth of the cross section of the canal. Because of the progressive growth of the cross section of the annular space of the canal, between cross section 20 and 21, we obtain a progressive transition of the unidimensional flow to an axisymmetric flow. Additionally, we impeach high velocity impact of large particles which could have passed trough the particle collector 2.

The module sketched on FIG. 6 presents the particularity that the carrier flow crosses it without swirl and that the particles concentrate within a peripheral layer along the inner wall.

FIG. 7 shows a version of an annulus nozzle, similar to the one of FIG. 6, but where the canal is diverging on it's whole length between the cross section of the throat and the final section 20. In this nozzle, it is the radially internal wall 16 which, by contraction with the fluid flow, confers to the nozzle it's diverging character.

FIGS. 8 to 9 show a second mode of design of a module 4 of formation of particles of liquefied substance and of separation of them from the flow of carrier fluid. This mode involves a flow canal 25 of rectangular cross section whose height is constant along it's whole length. The variation of the cross section according to the canal sketched on FIG. 6 is obtained by an appropriate variation of the width of the canal, as it emerges particularly clearly from FIG. 9. The characteristic cross sections are indicated on FIG. 8 and 9 with the same references as on FIG. 6. The module according to FIGS. 8 and 9 may be formed with plates superior 26 and inferior 27 which are curved in the separation section 13 like owing from FIG. 8 and between which two lateral braces 28 whose width varies like indicated on FIG. 9.

In this mode of design, one could round the canal in the angles to avoid local perturbations of the flow in the angles.

Like in the case of the annular nozzle of FIG. 7, the canal 25 may be divergent on it's whole length between cross sections 18 and 20.

The modules 4 according to FIGS. 8 and 9 are particularly convenient to be used in steam turbines systems and to produce a dry gas by a posterior expansion being possibly performed with a very high yield.

FIGS. 10 to 12 exhibit a set of three modules 4 according to FIGS. 8 and 9. Those modules are superposed and axialy lagged as to form a compact set wherein the inferior and superior walls of the parts of nozzle 12 of superior and inferior modules respectively form the superior and inferior walls of the intermediate module. At the level of the separation sections 13, which are bended, the common walls are thicker or constituted by two thin walls curved as needed, which delimit between them an empty space 31 which, in the axial way of the canals, has a transverse section having the shape of a lunula and allows to install additional devices, like for example, secondary separation means, intermediates drain, measurement instruments or means to inject solvents, tensio active agents or a secondary gaseous flow to form an air cushion or to avoid non desired secondary effect like erosion. In this case, at least one part of the walls is porous.

FIG. 13 shows a module 4 composed with 5 individual modules of nozzle and separation 4, identified by the references 33 to 37. The module 33 is advantageously of the kind sketched on FIG. 8 and 9, whereas the other modules 34 to 37 are constituted by sets of identical modules, for example according to FIGS. 10 to 12. The groups of individual modules 34 to 37 respectively involve two, four, eight, and sixteen canals of the kind sketched on FIGS. 8 and 9. The several modules 33 to 37 are mounted in parallel.

Each module is equipped at it's inlet with an isolation gate 39.

FIGS. 14 to 18 sketch a mode to design the module 4 according to the invention, which is particularly advantageous to treat a fluid flow wherein the concentration in particles is so high that it is not reasonable to make them grow.

The specific module has the general structure of the kind sketched on FIG. 8 and 9 but whose internal space of the part of nozzle 12 is divided by an axial separation wall into two separated canals 42 and 43, until the entrance in the separation section 13. The canal 42 is devoted to flow the fluid carrying the particles, whereas the canal 43 has for function to be the seat of an auxiliary flow carrying a liquefiable substance. Within this canal, the fluid undergoes an adiabatic expansion according to the invention to form a cloud of drops of relatively important diameter, like it has been explained before with more details. The principal flow also undergoes an expansion within canal 42 according to any appropriated pressure diagram. At the inlet of separation section 13, when the drops formed in the auxiliary flow are large enough, the flows, principal and auxiliary, which are approximatively parallel, are joined. The contact must advantageously be isokinetic to avoid turbulences and isotherm to avoid vaporization of drops. The relatively large drops of the auxiliary flow cross the streamlines of the principal flow under the effect of the force field created by the curvature of those streamlines. During their movement towards the inferior wall 27, the drops collect the smaller particles carried by the principal flow under the effect of a coagulation by forced diffusion.

This effect of absorption of small particles, by the thick ones in the separation section 13 is obtained even without any separation wall in the module 4 and is one of the major advantages of the invention. Indeed, thin solid particles like soot, for example, carried by the fluid and also a fog of thin particles will be separated from the fluid by the effect of forced coagulation described before. Indeed, the paths of the smaller particles and of the larger ones are crossing each other in the separation section because of their different mass.

The module 4 according to FIGS. 14 to 18 may be used for other purposes of particular interest in chemistry. It provides a particular mean to contact a gas with a liquid during a very short time lapse. It may also be used to produce calibrated particles. Indeed, the large drops formed in the auxiliary flow may stay at liquid state or solid after recompression if the principal flow they cross is cold enough. In this particular case, the contact between the two flows may not be isotherm.

FIGS. 19 to 23 are concerning an other mode of particular design of a module 4 according to the invention. The canal of the nozzle embodiment 12 of this module presents the general shape of the canal 25 of the design mode according to FIGS. 8 and 9. The characteristic cross sections of this canal are therefore indicated with the same references symbols as on those figures. The particularity of the design mode of FIGS. 19 to 23 resides in the structure of the lateral braces which are now hollowed and have an internal wall 45 which delimitate the flow canal 25 and an external wall 46. The internal wall 45 is deformable at the level of the cross section 18 forming the first throat of the nozzle. Under the effect of an adjustment screw 48 which crosses the external wall perpendicularly to the axis of the canal and whose internal extremity touches the internal face of the wall 45, advantageously by means of a piezo electric transducer 49, the area of the throat cross section is adjustable. On the other hand, at the level of cross section 20 forming the second throat, the wall 45 is rigid because of the transverse internal wall 50. Upstream of the throat 18, the wall 45 is cut in 51 under it's whole eight. The free extremities are configurated as to have the extremity of the deformable wall partially covers the extremity zone of the other wall which is rigid and chanfered, as to allow a slipping movement of the mobile portion on the fixed one.

An embodiment of rectilinear axial wall 52 is positioned in the axis of the canal and starts from a zone upstream of the throat cross section 18 until further than the cross section of the second throat 20. The extremity positioned downstream of the flow if configurated as a dorsal fin whereas the upstream extremity is rounded. As it can be seen on FIGS. 20 and 21, the axial wall 21 is hollowed, at least in its portion crossing cross section 20. The walls are deformable at the level of the throat 20, like it emerges from FIG. 21 on which those walls are cambered in the external direction. FIG. 22 shows that this deformation of the axial wall 52 permits to adjust the area of the cross section of the second throat 22 of the nozzle may be obtained with the help of, for example, pressurized air whose circulation circuit involves a compressing embodiment 54 and a gate 55. The variations of the area of the cross section of the first throat 18 allow to control the diameter of the drops and, for example, to increase their diameter. The piezo electric transducers 49 may produce a periodic variation of the area of the cross section of the throat such as that the subcooling may vary around the nucleation sill. Proceeding that way, a reduced number of drops may be periodically formed in the flow. It then contents axialy a succession of flow slices wherein no drops were formed and slices wherein drops were formed, the first constituting growth reservoirs for the drops formed in adjacent slices. A large amount of supersaturated steam may so condense into a reduced number of drops of larger average diameter.

The variations of the area of the cross section of the second throat 20, with the help of the deformation of the axial internal wall 52 allows to modify the nominal flow of the nozzle embodiment and contributes to increase it's adjustment flexibility.

FIG. 23 illustrates the working principle of the embodiment for variations of the area of the cross section of the first throat 18, formed by the screws 48 and the piezo electric transducers 49. On the diagram of this FIG. 23, the horizontal vector v1 symbolises the average velocity of the fluid trough the cross section of the throat 18, whereas the rotating vector v2 represents the variation of the flow velocity produced by the transducers 49. The resulting vector Vr of both vectors v1 and v2 represents the instantaneous velocity of the flow trough the throat 18. The circles c1 and c2 concentric around the free extremity of the vector v1 respectively represent the velocity at which the subcooling of the fluid carrying the liquefiable substance reaches the sill of nucleation and the velocity at which the nucleation pulse ends. Within the circle c1 the flow is dry. It is a stable situation out of equilibrium. Outside of circle c2, the flow is diphasic. The annular space comprised between both circles may be considered as the nucleation zone, the Wilson zone. The length of the vector v1 is variable with the help of the screws 48 whereas the length of vector v2 is variable with the help of variations of the magnitude of the pulsation of the transducers 49.

FIG. 23 illustrates the periodic formation of slices wherein drops are formed and wherein there is no drops, depending on the fact the resulting vector Vr penetrates or not in the annular zone between both circles c1 and c2. The frequency of rotation of the vector v2 is preferably high to make sure that the flow is homogeneous enough when it arrives in the separation section 13.

The invention like described with the help of a non limitative mode of design has a large number of applications in industry.

So, the invention is particularly useful in the sector of energy recovery, industrial drying, drying of fluids carrying liquefiable substances and lowering of dew points of gases, of gas purification technology and aerosols separation and gas separation.

More precisely, a first principal application of the invention resides in the sector of industrial drying where it provides heat pumping systems, free of freons, unbulky and having a low operating cost, which perform the extraction of a vapour diluted in a carrier gas, the heat release in the carrier flow of a quantity of heat equal to the heat of vaporization of the amount of vapour extracted.

A second principal application of the invention resides in the field of gas drying where it's property to extract saturated vapours at liquid state from carrier gases may be used among others to achieve the following tasks:

Lowering the dew point of fumes flows and simultaneous reheat before release, possibly in combination with air pollution control systems, the polluting products being partially captured by the drops formed in the flow.

Lowering the dew point of gases before their introduction in pipelines to avoid the risk to form siphons in the lower sections or to reduce corrosion risks.

Extract moisture from rooms like bathrooms or collective showers to prevent the growth of microscopic mushrooms on the walls, or in kitchens, possibly in combination with a fan, to extract vapours of fat substances and reduce the risk of chimney fire.

Lowering of the dew point of an air stream or any other gas which must be desiccated, before chemical treatment.

A third principal application of the invention resides in the field of purification and separation of aerosols, by growth of the diameter of the particles to extract, by deposition of a condensate on those particles.

The module according to the invention may be used to purify the combustive air of an internal combustion engine. It permits to preheat the combustive air and to produce sweet water. This last application is of particular interest on boats or in countries where the ambient air has a high moisture content and where sweet water is expensive.

I claim:

1. Method for extracting from a gaseous fluid flow a liquefiable substance carried by said flow, said method comprising the steps of forcing said gaseous fluid flow carrying said liquefiable substance to flow through a nozzle of a convergent-divergent type having a channel comprising, in the direction of the fluid flow, upwards and downwards from a throat portion respectively a converging and a diverging channel portion in order to subject said flow in said nozzle to an adiabatic expansion involving a subcooling of said gaseous fluid and a pressure decrease in order to cause condensation of said liquefiable substance after said subcooling reaches a critical subcooling value at which nucleation of said liquefiable substance occurs, the subcooling having a maximum value after said critical subcooling value, slowing down the pressure decrease rate after the beginning of said nucleation reducing the distance of said maximum value with respect to said critical subcooling value until the condensation of the liquefiable substance causes production of a reduced number of liquefied substance particles in the form of drops having a relatively large diameter, and separating the liquefied substance from the carrier flow by separating said reduced number of large diameter drops from said gaseous fluid flow under the effect of inertial forces exerted on said drops.

2. Method according to claim 1, wherein the gaseous fluid flow including said liquefied substance particles is forced to follow a bent path, said separation of said particles from said gaseous fluid flow being the result of the inertion of said particles causing them to maintain their direction of movement.

3. Method according to claim 1, wherein the cross-sectional area of said throat of said nozzle is periodically changed in manner such as to produce in the nozzle channel portion downwards from said throat axially successively and automatically portions which alternately comprise portions with said liquefied substance particles and portions without such particles, the portions without particles being used as growth reservoirs for the particles formed in the portions with particles.

4. Method according to claim 1, and including the steps of causing a main gaseous carrier flow to flow through a converging-diverging nozzle, creating by means of said nozzle at the outlet thereof of a high velocity gaseous carrier flow, producing from a gaseous fluid flow including a liquefiable substance said gaseous fluid flow carrying said reduced number of larger diameter drops produced by means of a said adiabatic expansion, using this fluid flow as an auxiliary flow and causing said auxiliary flow to cross said small particles-carrying main flow in order to obtain an absorption of the small particles to be extracted by said liquefied substance drops by a forced diffusion coagulation effect to separate the small particles by separating the liquefied substance drops which have absorbed said small particles, thereby extracting small particles carried within a main gaseous carrier fluid.

5. Apparatus for extracting a liquefiable substance from a gaseous fluid flow carrying the same, comprising a gaseous fluid flow expansion nozzle including successively in the direction of gas flow a first gas flow channel portion having a cross-sectional area converging in the direction of the fluid flow, a second portion constituting a throat portion and a third channel portion having a cross-sectional area which diverges in the direction of the gas flow, said nozzle being capable of expanding a gaseous fluid flow carrying a liquefiable substance to achieve low temperatures and low pressures in the gaseous fluid flow within said nozzle and to form thereby by condensation particles of said liquefiable substance, and separating means for separating the liquefied substance particles from the gaseous fluid flow by inertial forces acting on the particles, wherein said nozzle channel has a profile in the vicinity of said throat portion upwardly and downwardly therefrom, shaped to cause the pressure and the flow rate in said zone to remain substantially constant over the nozzle channel axis so that the subcooling (SR) reaches the value at which nucleation starts, while the subcooling increase above this nucleation subcooling value remains below values of formation of a large number of small particles, and wherein the cross-sectional areas of said third diverging channel portion increases only to a small extent so that the subcooling decreases below the nucleation value and insures the growth of the particles formed in the throat portion instead of causing the formation of supplementary particles.

6. Apparatus according to claim 5, wherein the channel portion located upwardly from the nozzle throat has a shape of a nozzle conceived for a non-condensing fluid flow having a constant instantaneous expansion rate over the axis of the nozzle and the shape of said nozzle channel portion located downwardly from the nozzle throat has the shape of the nozzle conceived in a way that the moisture content is maximum in each section of the channel.

7. Apparatus according to claim 5 wherein said nozzle channel comprises downstream of said third diverging channel portion a fourth converging channel shaped in a way to continue the expansion of the fluid at a nucleation rate substantially zero.

8. Apparatus according to claim 5, wherein the nozzle channel portion downstream from said third diverging portion is diverging along its entire length.

9. Apparatus according to claim 5, wherein a device is provided following said nozzle for separating large diameter particles from said gaseous fluid flow, and wherein said nozzle and said separator device are realized in one body which is a revolution body including, successively in the direction of the fluid flow, a cylindrical inlet portion (11), and an annular portion (12. 13) in which the radially internal (16) and external (17) wall form between them said nozzle and the separator device (13) in which the diameter of the radially internal and external walls (16, 17) increase in a way to form an annular channel of constant height but having an increasing cross-sectional area.

10. Apparatus according to claim 5, wherein a module is provided which comprises a nozzle portion and a separator portion for separating the fluid particles produced in said nozzle portion from the gaseous fluid, wherein said nozzle and separator portions are formed successively in the fluid flow path in a same body with flow channel (25) having a substantially rectangular cross-section, a substantially constant height over the entire length but a width which varies for forming said inlet (11) nozzle (12) and separator (13) portions.

11. Apparatus according to claim 10, comprising the arrangement of a multitude of superposed nozzle and separator bodies.

12. Apparatus according to claim 10, wherein a multitude of said modules are superposed while being axially shifted with respect to one another in such manner that in the nozzle portion (12), the adjacent upper and lower walls of two adjacent modules are formed by one and the same wall, whereas in the separator portion, these walls form a space (31) permitting supplementary devices to lodge therein.

13. Apparatus according to claim 12, wherein a multitude of arrangements of said superposed modules is mounted in parallel relationship in the fluid carrier of the liquefiable substance.

14. Apparatus according to claim 13, comprising a multitude of arrangements having different numbers of identical nozzle and separator modules such as respectively one, two, four, eight, and sixteen identical nozzle and separator modules, a control or stop value being provided upwards of each arrangement.

15. Apparatus according to claim 5, wherein the wall surrounding flowing channel (25) is adapted to be deformed at least in the zone of the nozzle throat for varying the cross-sectional area of the throat and wherein control means for varying this cross-sectional area are provided, which are selectively actionable.

16. Apparatus according to claim 15, wherein the control means for varying the cross-sectional area comprises a member for adjusting the cross-sectional area to an average value and a member such as a piezoelectric element allowing a periodic variation of said cross-sectional area, around said average value, at a predetermined frequency.

17. Apparatus according to claim 16, wherein said nozzle channel comprises a second portion located downwardly from said throat portion and wherein a separator wall (52) is mounted in the channel in the axis thereof which extends over the entire height of the channel and advantageously from a location situated upwardly from said throat to a location situated downwardly from said second throat portion, and the shape of said separator wall being deformable in the region of the second throat so as to vary the cross-sectional area thereof to vary the nominal flow through the nozzle.

18. Apparatus according to claim 17, wherein said separator (52) has a portion of variable thickness which is hollow and made from a deformable material so that the thickness of said wall is variable by introducing in the inner space of the wall pressurized air or by means of a piezoelectric device.

19. Apparatus according to claim 5, wherein the flow channel is divided by an internal axial separator wall into two parallel channels conveying respectively a main and an auxiliary fluid flow, the auxiliary fluid flow carrying drops of relatively great volume produced by the adiabatic expansion and the main channel conveying a gaseous fluid flow carrying small particles to be extracted and the wall extending at least until the end of the nucleation zone.

* * * * *